(12) United States Patent
Sprosta et al.

(10) Patent No.: US 11,638,477 B2
(45) Date of Patent: *May 2, 2023

(54) SYSTEM AND METHOD FOR ASSESSING TOOTHBRUSH EFFECTIVENESS

(71) Applicant: Colgate-Palmolive Company, New York, NY (US)

(72) Inventors: Al Aquanza Sprosta, Maplewood, NJ (US); William Craelius, Piscataway, NJ (US); Colin Kosinski, Piscataway, NJ (US); Shiv Patel, Piscataway, NJ (US); Bianca Pineda, Piscataway, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,993

(22) Filed: Jul. 23, 2021

(65) Prior Publication Data
US 2021/0345765 A1  Nov. 11, 2021

Related U.S. Application Data

(63) Continuation of application No. 16/188,385, filed on Nov. 13, 2018, now Pat. No. 11,116,309.
(Continued)

(51) Int. Cl.
*A46B 15/00* (2006.01)
*G09B 19/00* (2006.01)
*A61C 17/22* (2006.01)

(52) U.S. Cl.
CPC ...... *A46B 15/0006* (2013.01); *G09B 19/0084* (2013.01); *A46B 15/0012* (2013.01); *A46B 2200/1066* (2013.01); *A61C 17/221* (2013.01)

(58) Field of Classification Search
CPC ............ A46B 15/0006; A46B 15/0012; A46B 2200/1066; G09B 19/0084; A61C 17/221
(Continued)

(56) References Cited

U.S. PATENT DOCUMENTS 4,435,163 A * 3/1984 Schmitt ................ G09B 23/283
434/266
6,152,733 A * 11/2000 Hegemann ......... A61C 17/3472
433/80

(Continued)

OTHER PUBLICATIONS

Lang et al., "Clinical validation of robot simulation of toothbrushing—comparative plaque removal efficacy", BMC Oral Health 2014, 14:82 (Year: 2014).*
(Continued)

*Primary Examiner* — Nathaniel T Woodward

(57) ABSTRACT

In one embodiment, the invention can be a system for determining toothbrush effectiveness, the system comprising a data capture subsystem comprising at least one sensor and configured to generate brushing data during a participant brushing session directed entirely by the participant, and at least one processor configured to receive the brushing data from the data capture subsystem. A brushing simulation subsystem includes artificial teeth; and a robotic arm configured to: hold a toothbrush; and receive from the at least one processor instructions for a motion to be carried out by the robotic arm, the motion of the robotic arm causing the toothbrush to carry out an automated brushing session upon the artificial teeth, the motion of the robotic arm being based on the brushing data captured during the participant brushing session.

20 Claims, 6 Drawing Sheets

Related U.S. Application Data

(60) Provisional application No. 62/586,671, filed on Nov. 15, 2017.

(58) Field of Classification Search
USPC .......................................................... 15/22.1
See application file for complete search history.

(56) References Cited

U.S. PATENT DOCUMENTS

| | | | |
|---|---|---|---|
| 6,536,068 B1* | 3/2003 | Yang .................. | A46B 15/0002 15/105 |
| 8,175,840 B2 | 5/2012 | Hwang et al. | |
| 8,769,758 B2 | 7/2014 | Jungnickel et al. | |
| 9,402,463 B2 | 8/2016 | Schmalhurst et al. | |
| 9,498,312 B2 | 11/2016 | Dykes et al. | |
| 10,004,322 B2 | 6/2018 | Jungnickel et al. | |
| 10,034,730 B2 | 7/2018 | Skaanland et al. | |
| 2009/0035739 A1 | 2/2009 | Alemzadeh | |
| 2010/0145654 A1* | 6/2010 | Hwang .............. | A46B 15/0006 706/15 |
| 2012/0198640 A1* | 8/2012 | Jungnickel ......... | A46B 15/0012 15/105 |
| 2013/0080295 A1* | 3/2013 | Dykes .................. | A61C 17/221 15/22.1 |
| 2014/0359956 A1* | 12/2014 | Jungnickel ............. | A46B 9/028 15/167.1 |

OTHER PUBLICATIONS

Driesen et al., 1996, "The development of the Braun Oral-B Ultra Plaque Remover: an in vitro robot study," Am. J. Dent. 9 Spec No. S13-17.

Ernst et al., 1997, "A robot system for evaluating plaque removal efficiency of toothbrushes in vitro," Quintessence International 28(7):441-445.

Lang et al., 2014, "Clinical validation of robot simulation of toothbrushing—comparative plaque removal efficacy," BMC Oral Health 14:82.

* cited by examiner

SYSTEM AND METHOD FOR ASSESSING TOOTHBRUSH EFFECTIVENESS

CROSS-REFERENCE TO RELATED PATENT APPLICATION

The present application is a continuation application of U.S. Non-Provisional patent application Ser. No. 16/188,385, filed Nov. 13, 2018, which claims the benefit of U.S. Provisional Patent Application Ser. No. 62/586,671, filed Nov. 15, 2017, the contents of which are hereby incorporated herein by reference in their entirety.

BACKGROUND

Clinical trials can be used to test the effectiveness of a toothbrush. But these trials are expensive and time consuming. Further, the brushing methods used by participants are inconsistent. What is needed is a system and method that efficiently and consistently tests the effectiveness of a toothbrush for a variety of brushing methods, including natural, unguided brushing methods.

BRIEF SUMMARY

The present disclosure may be directed, in one aspect, to a system for determining toothbrush effectiveness, the system comprising a data capture subsystem comprising at least one sensor and configured to generate brushing data during a participant brushing session directed entirely by the participant, and at least one processor configured to receive the brushing data from the data capture subsystem. A brushing simulation subsystem includes artificial teeth; and a robotic arm configured to: hold a toothbrush; and receive from the at least one processor instructions for a motion to be carried out by the robotic arm, the motion of the robotic arm causing the toothbrush to carry out an automated brushing session upon the artificial teeth, the motion of the robotic arm being based on the brushing data captured during the participant brushing session.

In another aspect, a method for determining toothbrush effectiveness includes a) providing a data capture subsystem comprising at least one sensor and configured to generate brushing data during a participant brushing session; b) instructing the participant to begin the participant brushing session, the participant brushing session being directed entirely by the participant; c) capturing the brushing data during the participant brushing session; d) transmitting the brushing data from the data capture subsystem to the at least one processor; e) instructing, by the at least one processor, a robotic arm to carry out a motion that causes a toothbrush to carry out an automated brushing session upon artificial teeth coated with a substance, the motion of the robotic arm being based on the brushing data captured during the participant brushing session; and f) determining an effectiveness of the toothbrush based on the substance determined to be removed from the artificial teeth during the automated brushing session.

In yet another aspect, a system includes a data capture subsystem comprising at least one sensor and configured to generate brushing data during a participant brushing session; at least one processor configured to receive the brushing data from the data capture subsystem; and a brushing simulation subsystem comprising artificial teeth coated with a substance; and a robotic arm configured to hold a toothbrush; and receive from the at least one processor instructions for a motion to be carried out by the robotic arm, the motion of the robotic arm causing the toothbrush to carry out an automated brushing session upon the artificial teeth, the motion of the robotic arm being based on the brushing data captured during the participant brushing session.

BRIEF DESCRIPTION OF THE DRAWINGS

The present disclosure will become more fully understood from the detailed description and the accompanying drawings, wherein.

DETAILED DESCRIPTION

Figure 1:
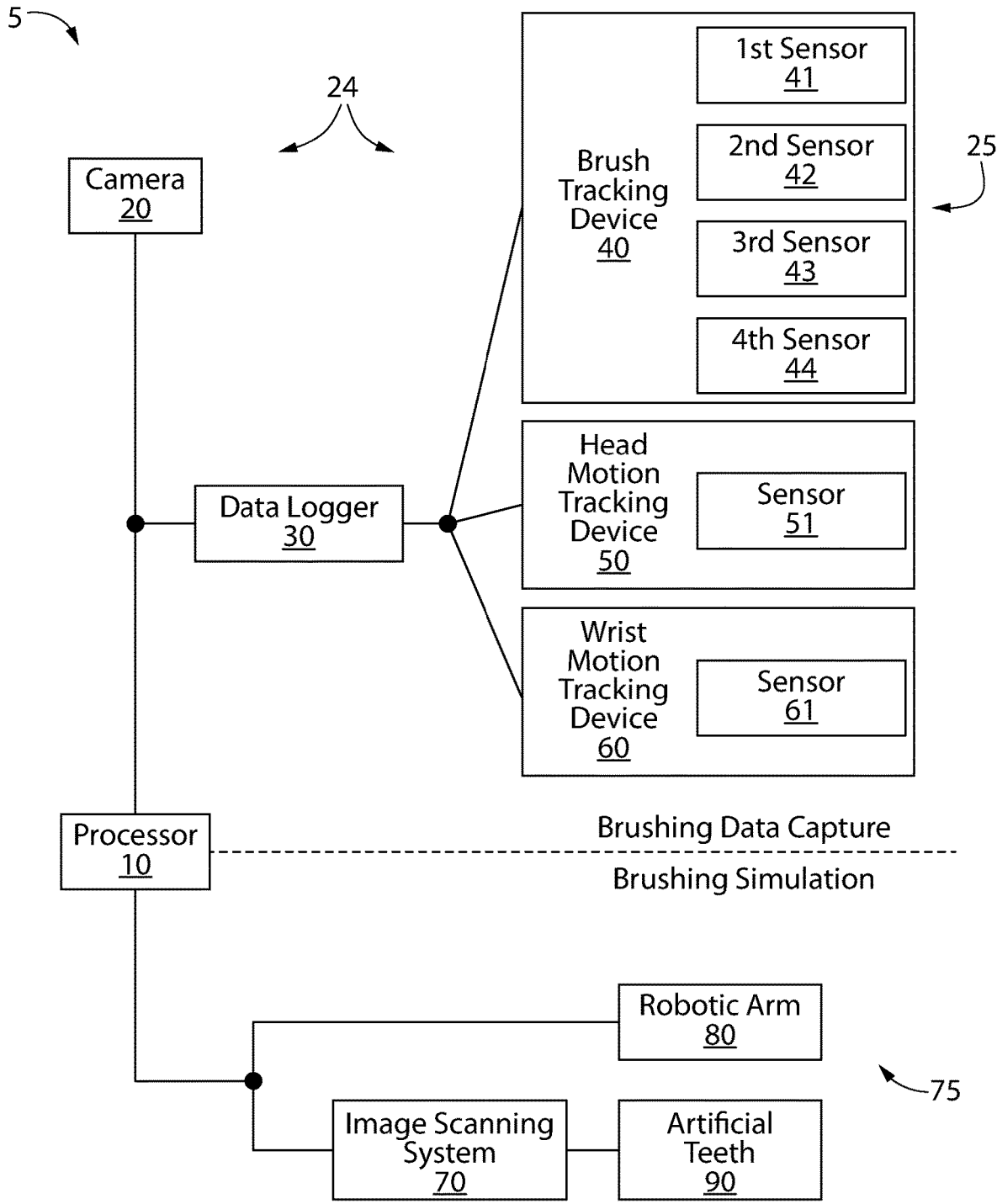
FIG. 1 is a block diagram of a system for testing toothbrush effectiveness according to one embodiment of the present invention.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring now to the figures, FIG. 1 is a block diagram of a system 5 for testing toothbrush effectiveness according to one embodiment of the present invention. The system 5 includes a data capture subsystem 25 for capturing data regarding the brushing routines of one or more participants, and a simulation subsystem 25 for carrying out one or more brushing routines (or a combination thereof). In one embodiment, the data capture subsystem 25 can generate a digitized library of numerous human natural (unguided) brushing routines (or brushing routines guided by an outsider to some extent). The simulation subsystem 75 can use a robotic arm to simulate brushing routines based on one or more of the captured brushing routines, and then evaluate the cleaning performances for different toothbrushes using the brushing routines.

The system 5 includes a processor 10 that can form part of each of the subsystems 25, 75, and can receive brushing data from the data capture subsystem 25, as well as data from the robotic arm 80 and image scanning system 70 of the simulation subsystem 75. In other embodiments, processor 10 can comprise a plurality of processors working together. For example, each subsystem 25, 75 can comprise one or more processors for carrying out the data processing discussed herein. It is noted that common components such as memory devices and power sources are not discussed herein, as their role would be easily understood by those of ordinary skill in the art.

The data capture subsystem 25 can include at least one data tracking device 24 for capturing brushing data. This brushing data can be indicative, for example, of a brush's motion and position during a brushing routine. In the exemplified embodiment, the brushing data is captured during a natural, unguided brushing session that is directed entirely by the participant. In other embodiments, the brushing session can be guided only insofar as the participant is told which general area to brush, and/or for how long. For example, the participant can be instructed to brush each quadrant of the mouth for 30 seconds, but not told the type of brushing motion to use. Or the participant can be asked to brush six areas of the mouth successively for 30 seconds each, these areas being the upper left molars, the upper front teeth (canine to canine), the upper right molars, the lower left molars, the lower front teeth, the lower right molars. In yet another embodiment, the brushing session can be guided by more specific instructions being provided to the participant (such as the brushing motion and/or frequency to use). Such instructions can be provided, for example, by using a tablet, smartphone, or intercom. The system 25 can be configured to digitally store brushing data for numerous different brushing routines, each linked to a specific participant.

In the exemplified embodiment, the data capture subsystem 25 includes the following data tracking devices 24: a brush tracking device 40, a head motion tracking device 50, a wrist motion tracking device 60, and a camera 20. The system 25 can also include a data logger 30 configured to receive brushing data from one or more brush tracking devices 24, store the brushing data, and transmit the brushing data to the processor 10. The data logger 30 can comprise multiple data loggers. In other embodiments, one or more of the data tracking devices 24 can send data directly to the processor 10.

The different devices will be discussed below in turn. The data capture subsystem 24 need not include each of these devices, but rather can include other devices, just one device, or any combination of devices, for capturing brushing data. Brushing data can concern parameters such as position, motion, acceleration, frequency, angle, and force (against the surface of the teeth).

In general, each tracking device 24 that is used for the data capture subsystem 25 generates at least part of the brushing data. For purposes of the present disclosure, the term "brushing data" is any type of information related to brushing during a brushing session that may be extracted or derived from a sensor or sensor signal, or from an image-capturing device such as a camera, regardless of the form of the extracted information, and combinations thereof. By way of example, brushing data may be in the form of mathematical data (such as a formula which mathematically represents at least part of the sensor signal), analog data (such as the waveform of the sensor signal), and/or digital data (such as a representation of at least part of the sensor signal in a digital format).

In the exemplified embodiment of FIG. 1, the data capture subsystem 25 includes a brush tracking device 40 configured to hold a first toothbrush of a participant. The brush tracking device 40 includes sensors 41, 42, 43, 44, at least one of which being configured to generate motion data during the participant brushing session, the motion data forming part of the brushing data. Specifically, in this embodiment, the first sensor 41 is a 3-axis accelerometer, the second sensor 42 is a 3-axis gyroscope, and the third sensor 43 is a 3-axis magnetometer. In one embodiment, a single chip including these different sensors can be used to provide 9 degrees of freedom. For example, the LSM9DS1 inertial measurement unit (IMU) chip from STMicroelectronics has this capability. In other embodiments, other types or combinations of sensors can be used, including a single sensor, such as a 6-axis accelerometer. For purposes of the present disclosure, the term "motion data" is any type of information related to a motion of a toothbrush (including acceleration, velocity, position, angle, and force) which may be extracted or derived from a sensor or sensor signal, regardless of the form of the extracted information, and combinations thereof.

Sensor data provided to the processor 10 can be used to determine other values. For example, pitch, roll, and/or heading data can be calculated from the accelerometer and gyroscope readings. Further, a majority of toothbrush motions resemble continuous oscillatory behavior, and the frequency of these motions can be calculated from the above sensor readings.

Further, the brush tracking device (or the data capture subsystem in general) can include a force sensor 44 configured to generate force data during the participant brushing session indicative of a force that bristles of the first toothbrush apply to the participant's teeth, the force data forming part of the brushing data. A system incorporating the above sensors can determine brush forces, frequency, and stroke size (and pattern) at certain locations.

Figure 2:
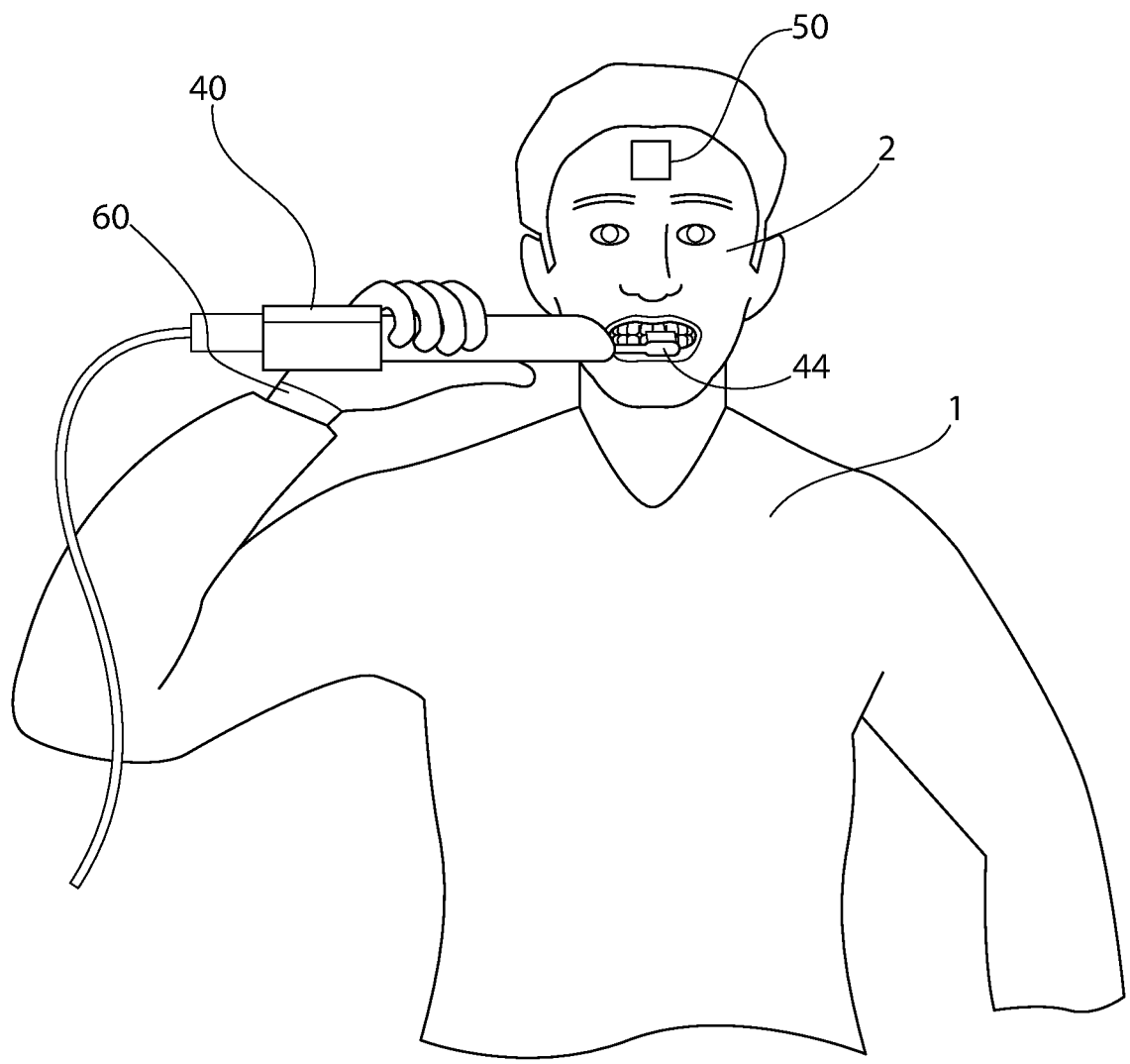
FIG. 2 is an image of a participant using a brush tracking device according to one embodiment of the present invention.

FIG. 2 is an image of a participant using a brush tracking device 40 according to one embodiment of the present invention. In the exemplified embodiment, the brush tracking device 40 has a housing that fits around at least a portion of the first toothbrush 44 of the participant 1. The sensors 41, 42, 43, 44 can be located within or on that device housing. Further the data from the brush tracking device 40 can be communicated to the processor by a wired or wireless connection.

Figure 3:
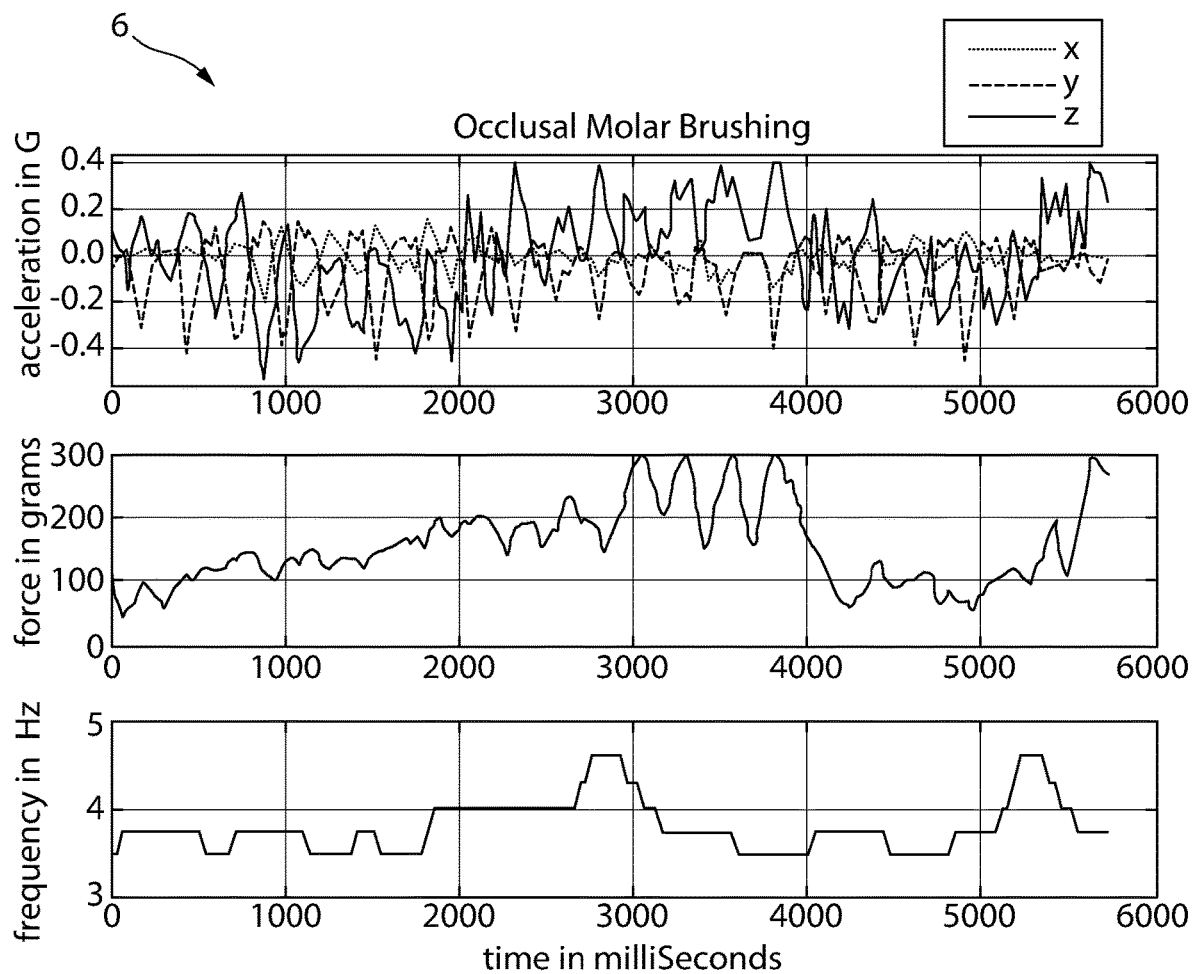
FIG. 3 is a graph of brushing data captured from a participant manual brushing session according to one embodiment of the present invention.
Figure 3:
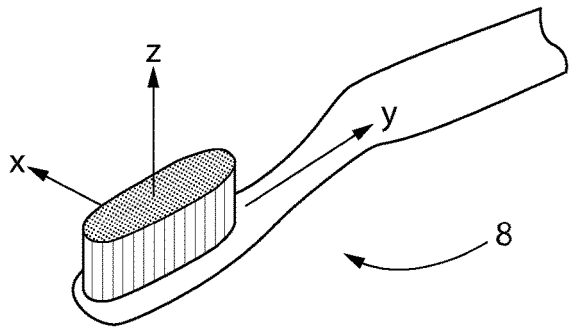

FIG. 3 is a graph 6 of brushing data captured from a participant brushing session according to one embodiment of the present invention. The graph 6 shows X, Y, and Z accelerations, force, and frequency for six seconds of brushing on the occlusal side of the molars. Positive values of acceleration follow the direction of the arrows displayed on the toothbrush graphic 8 also provided.

Motion path can be mapped in a program such as MATLAB for each participant. These motion paths can be used as guides for the robotic arm. MATLAB motions paths can then be translated to instructions for the robotic arm, such as WAM C++ instructions, to thereby enable the robotic arm to follow along the calculated motion paths.

Returning to FIG. 1, the data capture subsystem can further include a camera configured to capture image data during the participant brushing session, the image data forming part of the brushing data. Image data can be provided to a processor (such as processor 10), which can use image processing tools to determine or confirm the position or motion of the brush, including the brush head. For purposes of the present disclosure, the term "image data" is any type of information indicative of an image, including information extracted or derived from other information or data indicative of an image, regardless of the form of the extracted information, and combinations thereof. The image data may be in the form of mathematical data, analog data, and/or digital data.

As shown in FIG. 1, the data capture subsystem can further include a head motion tracking device 50 configured to attach to a portion of the head of the participant, the head motion tracking device 50 including a head motion sensor 51 capturing head motion data during a participant brushing session, the head motion data forming part of the brushing data. FIG. 2 shows the head motion tracking device 50 attached to the head 2 of a participant 1.

Head movement may add to or subtract from the actual motion delivered to the teeth. The head motion tracking device 50 detects additional brush motion created by head movement. The head motion tracking device can be a 9-degrees-of-freedom motion sensor equipped with an accelerometer, gyroscope, and magnetometer to analyze the head angle and movement of an individual using the brush tracking device. Head motions along the horizontal and vertical axes can be used to modify the brush motions and accommodate for extraneous head movement.

Returning to FIGS. 1 and 2, the data capture subsystem can further include a wrist motion tracking device 60 configured to attach to the participant's wrist and including at least one sensor 61 for capturing wrist-motion data, the wrist-motion data forming part of the brushing data. In one embodiment, the wrist motion tracking device 60 includes an accelerometer, gyroscope, and Bluetooth interface. The wrist motion tracking device 60 can be attached to the wrist and/or arm, and can be remotely controlled by a smartphone. The wrist motion tracking device 60 can capture movement, position, and rotation of the wrist, arm, and/or brush. In an alternative embodiment, rather than the brush tracking device and wrist motion tracking device each having sensors such as an accelerometer and gyroscope, those sensors can be present only in the wrist motion tracking device, while the brush tracking device houses a force and torque sensor.

Simulation Subsystem

Returning to FIG. 1, as discussed above, the system 5 further includes a simulation subsystem 75. This subsystem 75 can include artificial teeth 90 coated with a substance and a robotic arm 80 configured to hold a second toothbrush. The robotic arm 80 can also be configured to receive from the at least one processor 10 instructions for a motion to be carried out by the robotic arm 80, the motion of the robotic arm 80 causing the second toothbrush to carry out an automated brushing session upon the artificial teeth 90. The motion of the robotic arm can be based on the brushing data captured from the data capture subsystem 25 during the participant brushing session. The at least one processor 10 can be configured to determine an effectiveness of the second toothbrush based on the substance determined to be removed from the artificial teeth 90 during the automated brushing session.

The simulation subsystem 75 can be configured to carry out multiple automated brushing sessions on multiple artificial teeth to test the effectiveness of the second toothbrush. In this case, the brushing simulation subsystem 75 is configured to repeat the carrying out of the automated brushing session for a plurality of artificial teeth 90 having the substance. Further, the determination of the effectiveness of the second toothbrush is based on the substance determined to be removed from each of the plurality of artificial teeth during each automated brushing session.

Further, the data capture subsystem 25 can be configured to carry out multiple data capture sessions. In this case, data capture subsystem 25 is configured to repeat the capture of the brushing data for a plurality of participant brushing sessions from a plurality of participants. Further, the motion of the robotic arm can be based on the brushing data from the plurality of participant brushing sessions. For example, the processor 10 can process the brushing data from the participants and create a composite brushing session that is based on one or more participant brushing sessions. For example, brushing sessions can be divided into different categories, and each category of brushing sessions can have a composite brushing session that is representative of one or more of the brushing sessions in the category. Alternatively, an overall composite brushing session can be created based on a plurality of brushing sessions. This overall composite brushing session can attempt to represent a typical human brushing session. Different mathematical methods can be used to process the brushing data to combine brushing data from different brushing sessions. In yet another embodiment, the robotic arm can carry out separate automated brushing sessions for each participant brushing session, where each automated brushing session simulates a single participant brushing session. The invention is not limited to any single approach.

Figure 4:
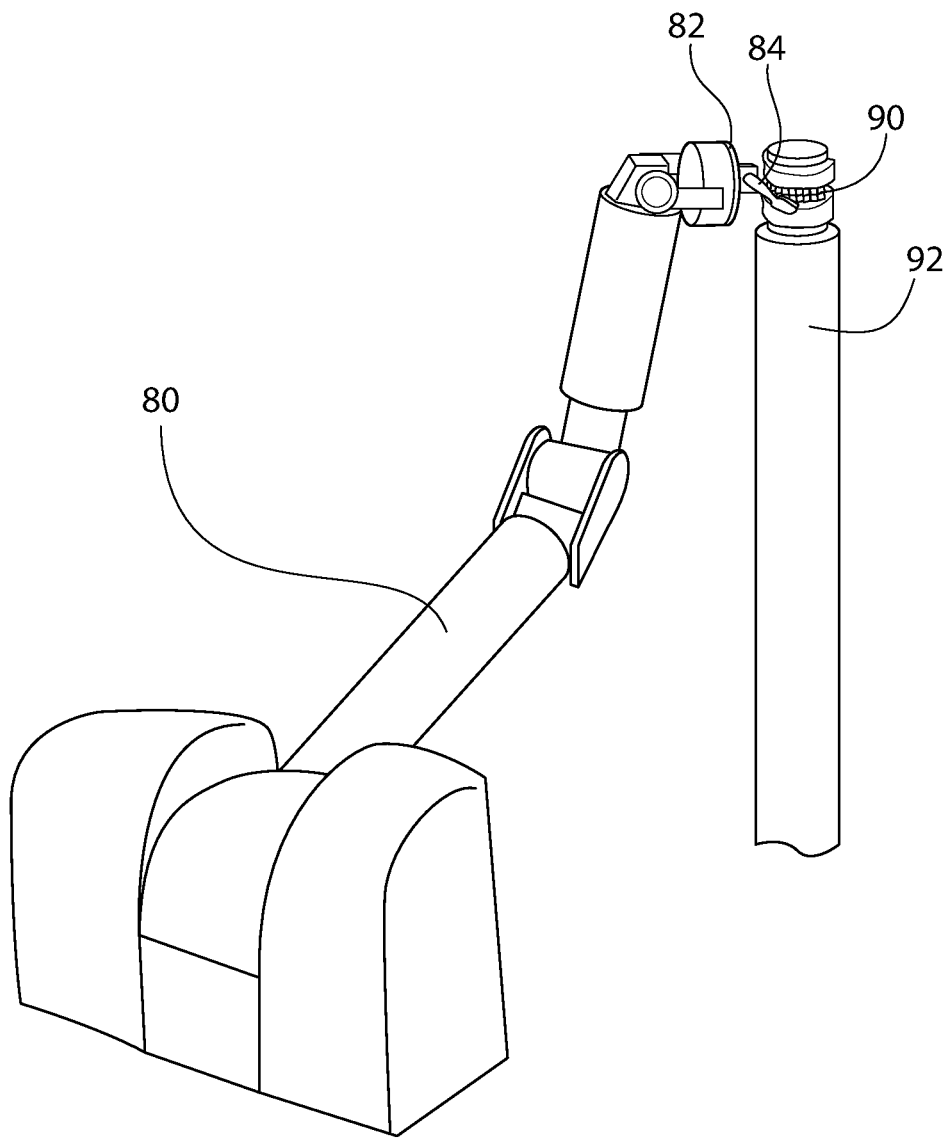
FIG. 4 is an image of a robotic arm brushing artificial teeth according to one embodiment of the present invention.

FIG. 4 is an image of the robotic arm 80 brushing artificial teeth 90 according to one embodiment of the present invention. Several types of robotic arms can be used, such as the WAM™ robot arm from Barret Technology Inc, which has seven degrees of freedom and can mimic human arm range of motion. Such a robotic arm can be programmed to carry out an automated brushing session based on brushing data from participant brushing sessions.

This figure also shows the second toothbrush 84 held by the robotic arm 80, the second toothbrush 84 brushing the artificial teeth 90. The artificial teeth are held by a teeth holder 92 for holding the teeth in a fixed position during an automated brushing session. Further, the robotic arm can include a force and torque sensor 82. This sensor 82 is discussed in more detail below.

Figure 5:
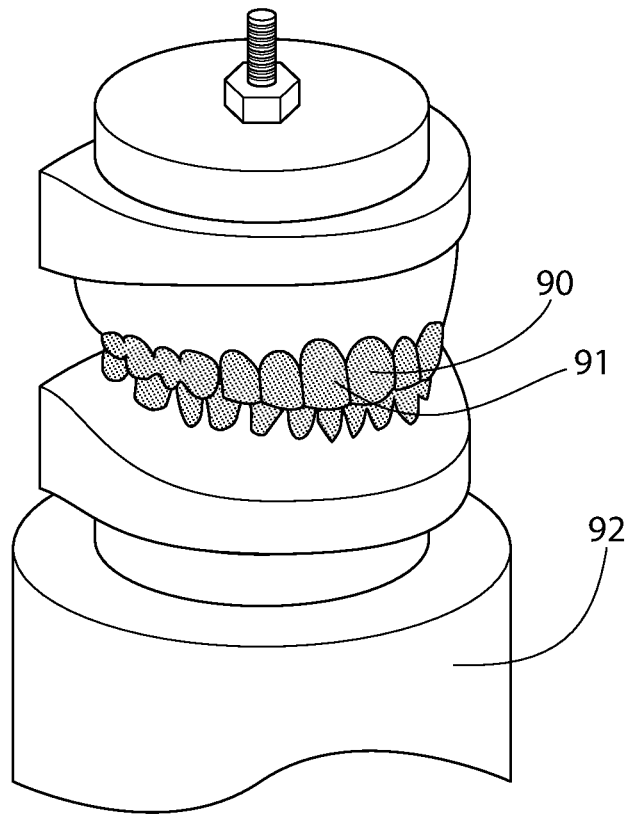
FIG. 5 is an image of artificial teeth secured to a teeth holder according to one embodiment of the present invention.

FIG. 5 is an image of artificial teeth 90 secured to a teeth holder 92 according to one embodiment of the present invention. The brushing simulation subsystem includes the rigid teeth holder 92 for holding the artificial teeth in a fixed position. In the exemplified embodiment, the teeth holder 92 is a rigid aluminum structure to which the artificial teeth are bolted, and the height of the aluminum tubing is optimal for interaction with the robot-guided second toothbrush. In other embodiments, other structures can be used to secure the artificial teeth during an automated brushing session.

The artificial teeth 90 can include a substance 91. In one-embodiment, the substance is a plaque-like coating, though the invention is not so limited. An image scanning system 70 (see FIG. 1) can be configured to capture images of the artificial teeth before and after the automated brushing session. The images can be processed to determine a cleanliness score for each image based on how much of the substance is present. The change in score can be used to determine how effective the second toothbrush was at removing plaque when using the automated brushing session. In other embodiments, other approaches can be used for determining how effectively the artificial teeth are cleaned.

Figure 6:
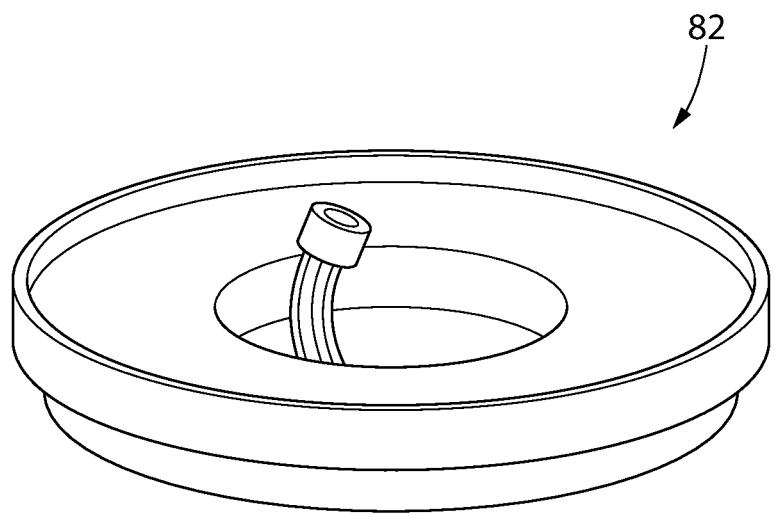
FIG. 6 is an image of a force and torque sensor according to one embodiment of the present invention.

As discussed above, the robotic arm 80 can include or utilize a force sensor and/or torque sensor 82 configured to provide feedback as to whether an applied motion and force to the artificial teeth corresponds with the brushing data captured during the participant brushing session. In the exemplified embodiment, the sensor 82 is a 6-axis force and torque sensor and is installed at the robot endpoint to increase the resolution of the low-level endpoint forces (see FIG. 6).

To impart a constant force relative to the bristles' direction, the system can have an open loop mode that utilizes a force-torque sensor. In the open loop control mode, the robotic arm can apply motor torques that will theoretically produce the desired applied force at the toothbrush bristles. The closed loop mode can use readings from the force-torque sensor at the robot's endpoint and modify the applied motor torques to more closely achieve the desired force. This mode provides more accurate force control than an open loop mode and ensures that the bristles remain in contact with the teeth. In other embodiments, an open loop mode (with a force or torque sensor) can be used.

Figure 7:
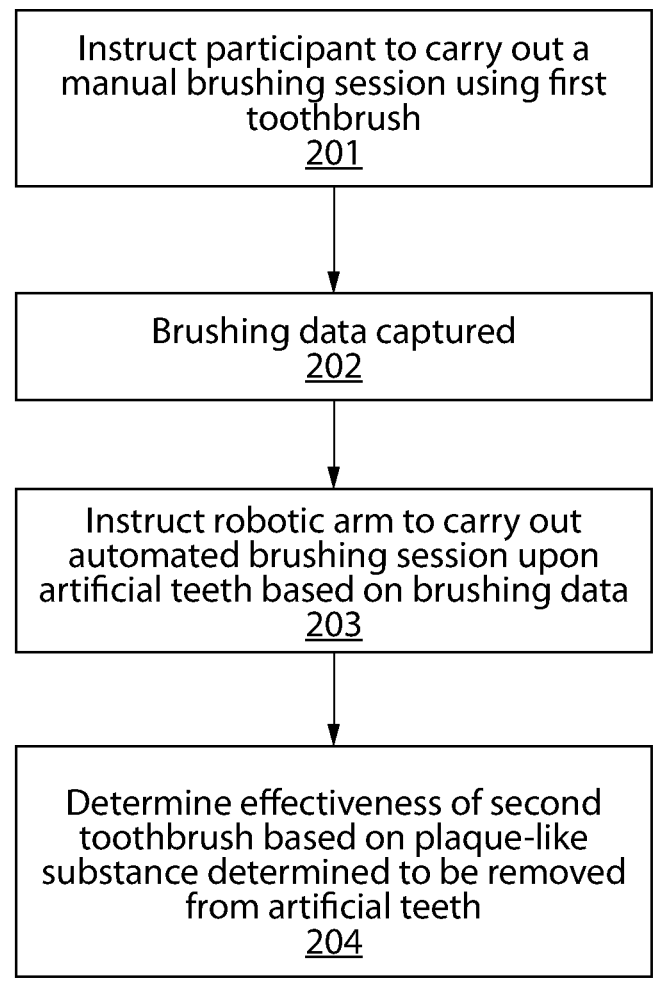
FIG. 7 is a flow chart for a method for determining toothbrush effectiveness according to one embodiment of the present invention.

According to one embodiment shown in FIG. 7, a method for determining toothbrush effectiveness can include providing a participant a data capture subsystem configured to capture brushing data during a participant brushing session, the data capture subsystem comprising a brush tracking device configured to hold a first toothbrush and comprising at least one motion sensor, the at least one motion sensor configured to generate motion data during the participant brushing session, wherein the motion data forms part of the brushing data.

The participant can be instructed to begin the participant brushing session, the participant brushing session being directed entirely by the participant (operation 201). Further, the brushing data can be captured during the participant brushing session (operation 202). Further, the brushing data can be transmitted from the data capture subsystem to the at least one processor. Further, the at least one processor can instruct a robotic arm to carry out a motion that causes the second toothbrush to carry out an automated brushing session upon artificial teeth coated with a substance, the motion of the robotic arm being based on the brushing data captured during the participant brushing session (operation 203). Further, the effectiveness of the second toothbrush can be determined based on the substance determined to be removed from the artificial teeth during the automated brushing session (operation 204). The inventions, however, are not so limited.

The embodiments discussed herein provide several advantages. For example, they enable the testing and evaluation of different toothbrush designs under similar or identical conditions, thus dramatically reducing the time-to-market and development costs by enabling faster brush testing. This approach will also eliminate much of the variability and subjectivity from testing and product-development, while still considering the natural, unguided brushing motions of typical toothbrush users.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A system comprising:
   a data capture subsystem comprising at least one sensor and configured to generate brushing data during a participant brushing session directed entirely by the participant;
   at least one processor configured to receive the brushing data from the data capture subsystem; and
   a brushing simulation subsystem comprising:
      artificial teeth; and
      a robotic arm configured to:
         hold a toothbrush; and
         receive from the at least one processor instructions for a motion to be carried out by the robotic arm, the motion of the robotic arm causing the toothbrush to carry out an automated brushing session upon the artificial teeth, the motion of the robotic arm being based on the brushing data captured during the participant brushing session.

2. The system of claim 1 wherein the data capture subsystem comprises a brush tracking device configured to hold a toothbrush of the participant and comprising the at least one sensor, the brush tracking device further configured to generate motion data, wherein the brushing data comprises the motion data.

3. The system of claim 1:
   wherein the artificial teeth are coated with a substance; and
   wherein the at least one processor is further configured to determine an amount of the substance removed from the artificial teeth during the automated brushing session.

4. The system of claim 1:
   wherein the data capture subsystem is configured to repeat the capture of the brushing data for a plurality of participant brushing sessions from a plurality of participants; and
   wherein the motion of the robotic arm is based on the brushing data from the plurality of participant brushing sessions.

5. The system of claim 1 wherein the automated brushing session simulates the participant brushing session.

6. The system of claim 1 wherein the at least one sensor of the data capture subsystem comprises at least one of a 3-axis accelerometer, a 6-axis accelerometer, a gyroscope, a magnetometer, and a force sensor.

7. The system of claim 1:
   wherein the data capture subsystem further comprises a force sensor configured to generate force data during the participant brushing session indicative of a force that bristles of a participant toothbrush apply to the participant's teeth; and
   wherein the brushing data comprises the force data.

8. The system of claim 1:
   wherein the data capture subsystem further comprises a camera configured to capture image data during the participant brushing session; and
   wherein the brushing data comprises the image data.

9. The system of claim 1:
   wherein the data capture subsystem further comprises a wrist motion tracking device configured to attach to the participant's wrist and comprising at least one sensor for capturing wrist-motion data; and
   wherein the brushing data comprises the wrist-motion data.

10. The system of claim 1 wherein the data capture subsystem comprises a sensor for generating data concerning at least one of position, acceleration, frequency, and force, the data forming part of the brushing data.

11. The system of claim 1 wherein the data capture subsystem further comprises a data logger configured to receive the brushing data from the data capture subsystem, store the brushing data, and transmit the brushing data to the processor.

12. The system of claim 1 wherein the robotic arm further comprises a force sensor and a torque sensor configured to provide feedback as to whether an applied motion and force to the artificial teeth corresponds with the brushing data captured during the participant brushing session.

13. The system of any of claim 1:
   wherein the data capture subsystem further generates a composite brushing data set, the composite brushing data set being representative of a plurality of sets of the brushing data corresponding to a respective plurality of brushing sessions; and
   wherein the motion of the robotic arm is based on the composite brushing data set.

14. The system of claim 1:
   wherein the artificial teeth are coated with a substance;
   wherein an image scanning system is configured to capture images of the artificial teeth before and after the automated brushing session; and
   wherein the images are processed to determine a cleanliness score for each image based on how much of the substance is present.

15. A method comprising:
   a) providing a data capture subsystem comprising at least one sensor and configured to generate brushing data during a participant brushing session;
   b) instructing the participant to begin the participant brushing session, the participant brushing session being directed entirely by the participant;
   c) capturing the brushing data during the participant brushing session;
   d) transmitting the brushing data from the data capture subsystem to the at least one processor; and
   e) instructing, by the at least one processor, a robotic arm to carry out a motion that causes a toothbrush to carry out an automated brushing session upon artificial teeth, the motion of the robotic arm being based on the brushing data captured during the participant brushing session.

16. The method of claim 15 wherein the data capture subsystem comprises a brush tracking device configured to hold a toothbrush of the participant and comprising the at least one sensor, the brush tracking device further configured to generate motion data, wherein the brushing data comprises the motion data.

17. The method of claim 15:
wherein the artificial teeth are coated with a substance; and
wherein the at least one processor is further configured to determine an amount of a substance removed from the artificial teeth during the automated brushing session.

18. The method of claim 15:
further comprising repeating steps a) to e) for a plurality of participants to capture the brushing data for a plurality of participant brushing sessions;
wherein the motion of the robotic arm is based on the brushing data from the plurality of participant brushing sessions.

19. The method of claim 15 wherein the automated brushing session simulates the participant brushing session.

20. The method of claim 15 wherein the at least one sensor of the data capture subsystem comprises at least one of a 3-axis accelerometer, a 6-axis accelerometer, a gyroscope, a magnetometer, and a force sensor.

* * * * *